United States Patent [19]

Senalada

[11] Patent Number: 5,170,699
[45] Date of Patent: Dec. 15, 1992

[54] JUICE MAKING MACHINE

[75] Inventor: Jose M. M. Senalada, Valencia, Spain

[73] Assignee: Maquinas y Elementos S.A., Valencia, Spain

[21] Appl. No.: 872,547

[22] Filed: Apr. 22, 1992

[30] Foreign Application Priority Data

May 24, 1991 [ES] Spain ................................. 9101254

[51] Int. Cl.⁵ .............................................. A23N 1/00
[52] U.S. Cl. ....................................... 99/504; 99/507
[58] Field of Search ........................... 99/495, 501–504, 99/506, 507, 508; 100/98 R, 213

[56] References Cited

U.S. PATENT DOCUMENTS

| | | | |
|---|---|---|---|
| 746,720 | 12/1903 | Lyon | 99/504 |
| 1,386,552 | 8/1921 | Carney | 99/504 |
| 1,888,528 | 11/1932 | Faulds | 99/502 |
| 1,888,529 | 11/1932 | Faulds | 99/502 |
| 2,270,007 | 1/1942 | McKinnis | 99/507 |
| 2,354,721 | 8/1944 | Walker et al. | 99/504 |
| 2,602,479 | 7/1952 | Trainor | 99/504 |
| 2,630,849 | 3/1953 | Williams | 99/504 |
| 2,707,981 | 5/1955 | Trainor | 99/507 |
| 2,753,904 | 7/1956 | Trainor | 99/504 |
| 4,479,424 | 10/1984 | Carroll | 100/98 R |

FOREIGN PATENT DOCUMENTS 456109 3/1950 Italy ................................. 99/502

Primary Examiner—Timothy F. Simone
Attorney, Agent, or Firm—Michael J. Striker

[57] ABSTRACT

A machine for extracting juice from citrus fruits, has at least two first cylinders each having a plurality of substantially semi-spherical cavities for accommodating fruits rotatable in opposite directions to transport the fruits, a cutter located downstream of the first cylinders so as to bisect the fruits into two halves which remain lodged in the cavities of the first cylinders, at least two second cylinders located downstream of the first cylinder and each provided with a plurality of substantially spherical protrusions and rotatable so that during rotation the protrusions extend into each fruit embedded in the cavities of the first cylinders with a gap which remains between the protrusions and the cavities and is substantially equivalent to a thickness of a peel of the fruits thereby preventing excessive crushing of the peel. The first cylinders and the second cylinders are rotatable synchronously so that the peel remains sticking to the protrusions. The protrusions are provided with grooves. Also, blades penetrate into the grooves of the protrusions during rotation of the cylinders so as to catch and throw off the peel while the juice flows freely without any further contact with a discarded part of the fruits.

11 Claims, 5 Drawing Sheets

JUICE MAKING MACHINE

BACKGROUND OF THE INVENTION

The present invention relates to a machine for extracting juice from citrus fruits, or in other words to a juice making machine.

Juice making machines are known in the art. There are currently several different types of juice making machines on the part. Each performs more or less the same operation and is used as a classic juice extractor for households. There are basically two types of such machines and they operate as follows:

In the machine of one type the oranges or other citrus fruits are fed into a machine one by one. Then they are pressed down by a lever which also pushed on a cutting blade slicing the fruit into two. The two halves then slide down ramps into two rubber cups with a semi-spherical shape to catch the fruit. Some kind of tampon or pressing tool then comes down on the fruit halves in the cups to squeeze the juice out. In the other system a lever is also used, but instead rubber balls are lowered onto the fruit contained in the grooved cups. The juice then runs into the interior of the machine into a receptacle designed for this purpose. Finally there is another type of machine operating in a manner similar to the above described, with the exception that the operation is performed by a central control system with cylinders using hydraulics.

In all the above described cases, the pressing of the citric fluid onto a grooved surface to extract the juice results in the pressing of the peel. As a result alveolar liquids contained in the honeycomb-like cellular structure of the peel and the essential oils contained in the same are added to the juice. Also, an important part of the juice retained in the residual pulp is left out. As a result the extracted juice has low quality.

SUMMARY OF THE INVENTION

Accordingly, it is an object of the present invention to provide a machine for extracting juice from citrus fruits, which avoids the disadvantages of the prior art.

In keeping with these objects and with others which will become apparent hereinafter, one feature of the present invention resides, briefly stated, in a machine of the above mentioned general type which has at least two first cylinders provided with a plurality of semi-spherical cavities for receiving fruits, a cutting element located so that when the fruits are transported by the first cylinders said cutting element bisects the fruit into two halves retained in the cavities of the first cylinders, at least two second cylinders each provided with protrusions penetrating into each fluid embedded in the cavities of said first cylinders and spaced from said cavities by a distance substantially corresponding a peel thickness, said cylinders being rotatable in a synchronized manner and centers of said cavities and said projections having the same linear velocity and an enveloping movement is produced between a surface of said cavities and a surface of said projections, said projections being provided with grooves; and a plurality of blades penetrating into said grooves so as to catch and throw off the peel so that the juice flows freely without any further contact with a discarded part of the fruit.

When the machine is designed in accordance with the present invention, it has a higher yield per time unit, a small size making it suitable for the use in bars, cafeterias, schools, colleges, hospitals, etc., a simple construction, and a visibility of the process thus showing to the consumer how the juice comes from the fruit chosen to be squeezed.

Also, in the machine in accordance with the present invention during the extraction, excessive pressure on the fruit by the parts of the machine which press down on the fruit is eliminated. As a result, the extracted fruit remains free of the alveolar liquids contained in the honeycomb cells of the peel and from other oily essences in the peel.

Finally, the machine separates the peel from the extracted juice at a maximum speed, avoiding any disadvantageous contact between them, and also preventing any substances contained in the peel from contaminating and diluting the extracted juice.

Due to the shape of the semi-spherical cavities in the cylinders and the shape of the semi-spherical protrusions of the other set of the cylinders, the sections of peel adhere to the male pieces, the meshing with the female parts produces simultaneously an enveloping movement accompanied by a pressure sufficient to yield a better extract from the pulp of the fruits.

Further, the parts of the machine are composed of antiseptic materials, they can be either taken apart by hand, and they can be quickly and efficiently cleaned.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
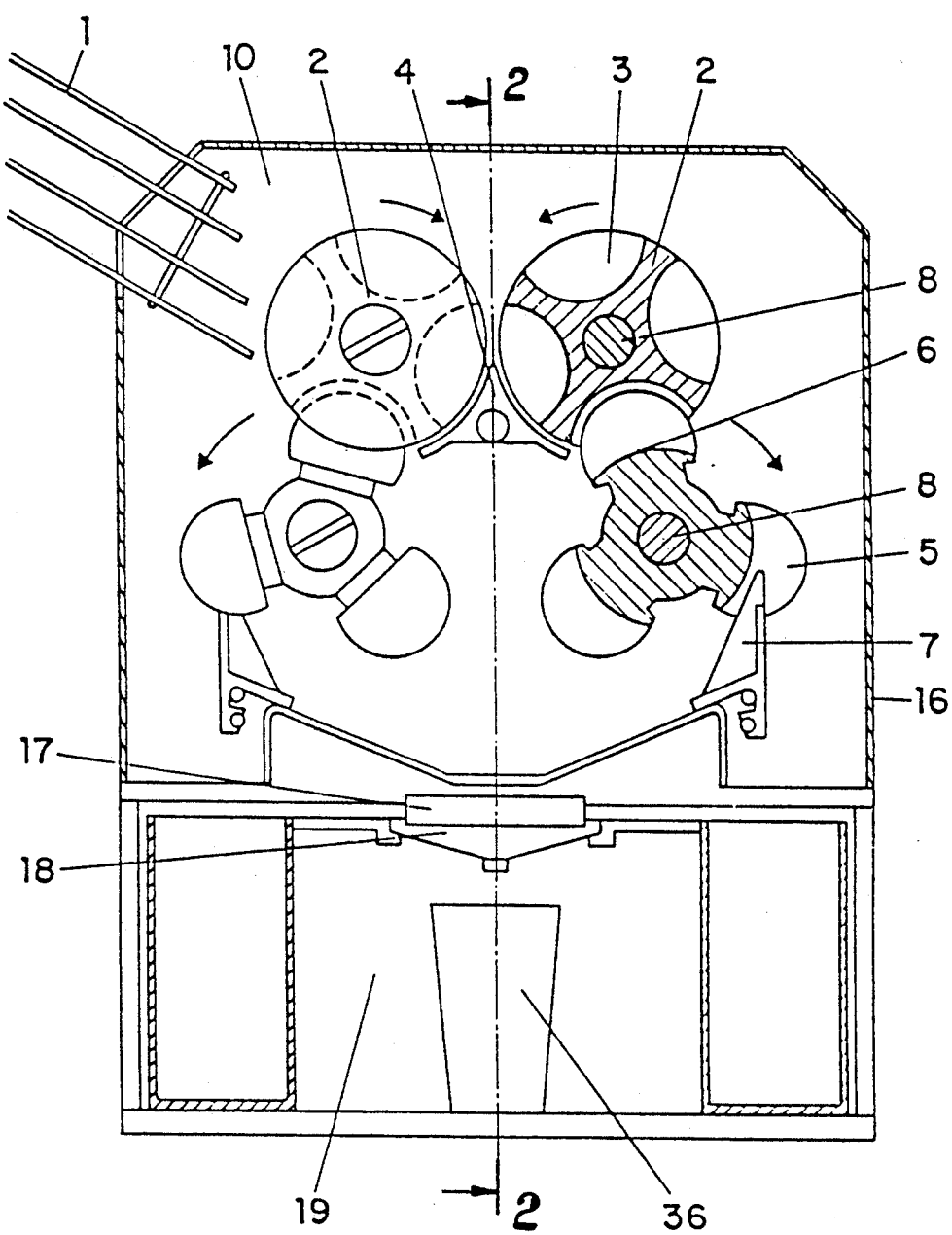
FIG. 1 is a front view showing a juice extracting machine in accordance with the present invention.
Figure 2:
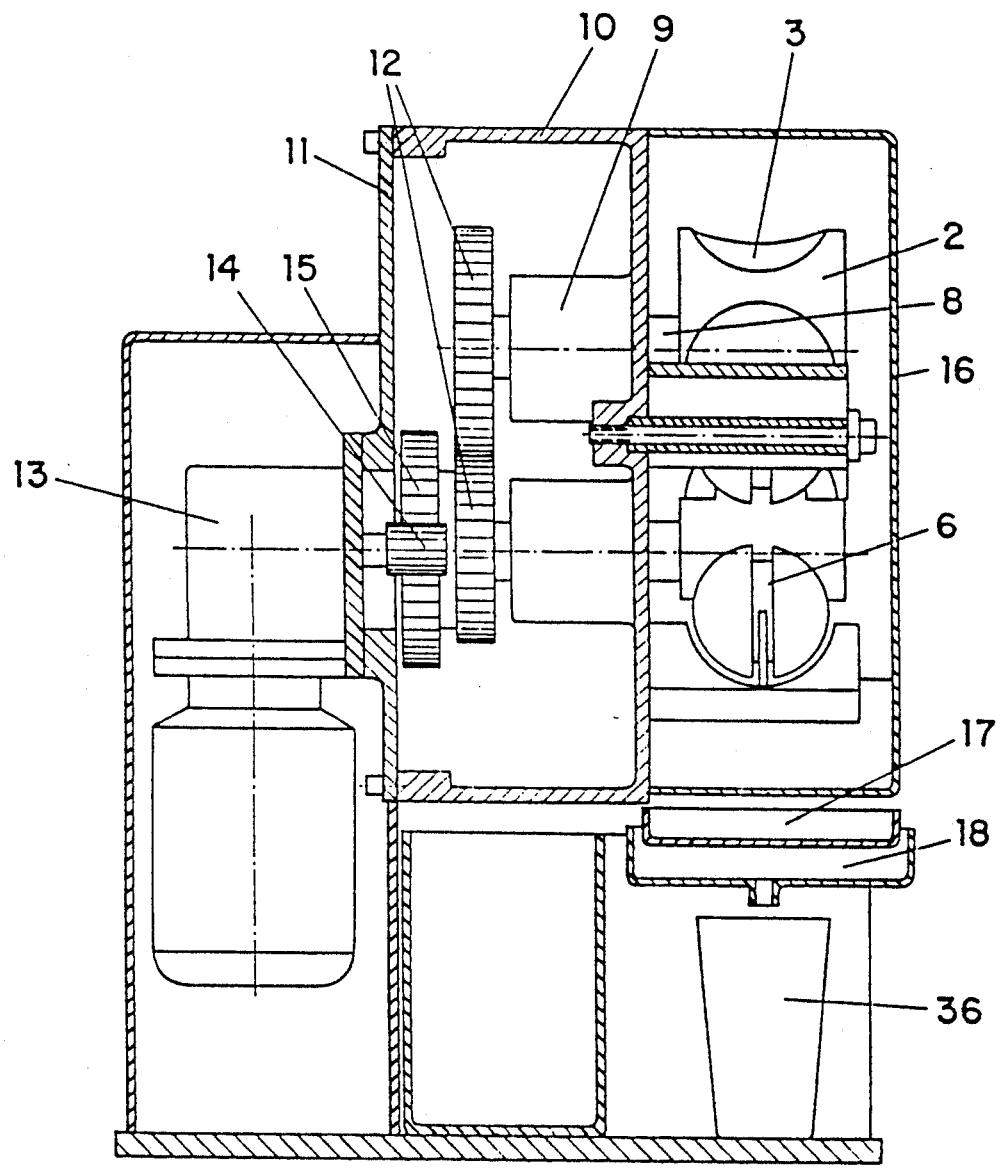
FIG. 2 is a view showing a section of the inventive machine taken along the line A—A in FIG. 1.
Figure 3:
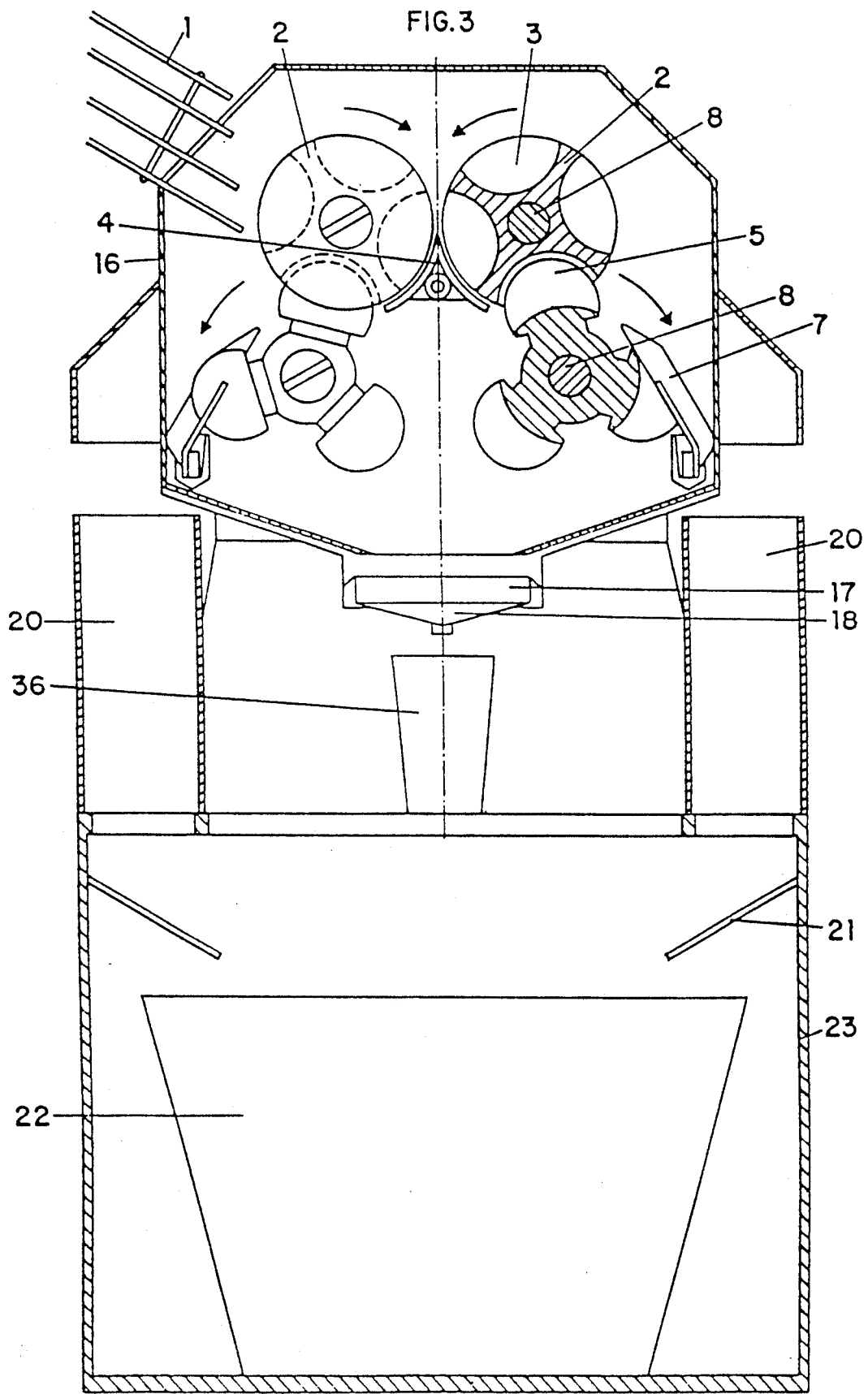
FIG. 3 is a view showing second embodiment of the inventive juice extracting machine.
Figure 4:
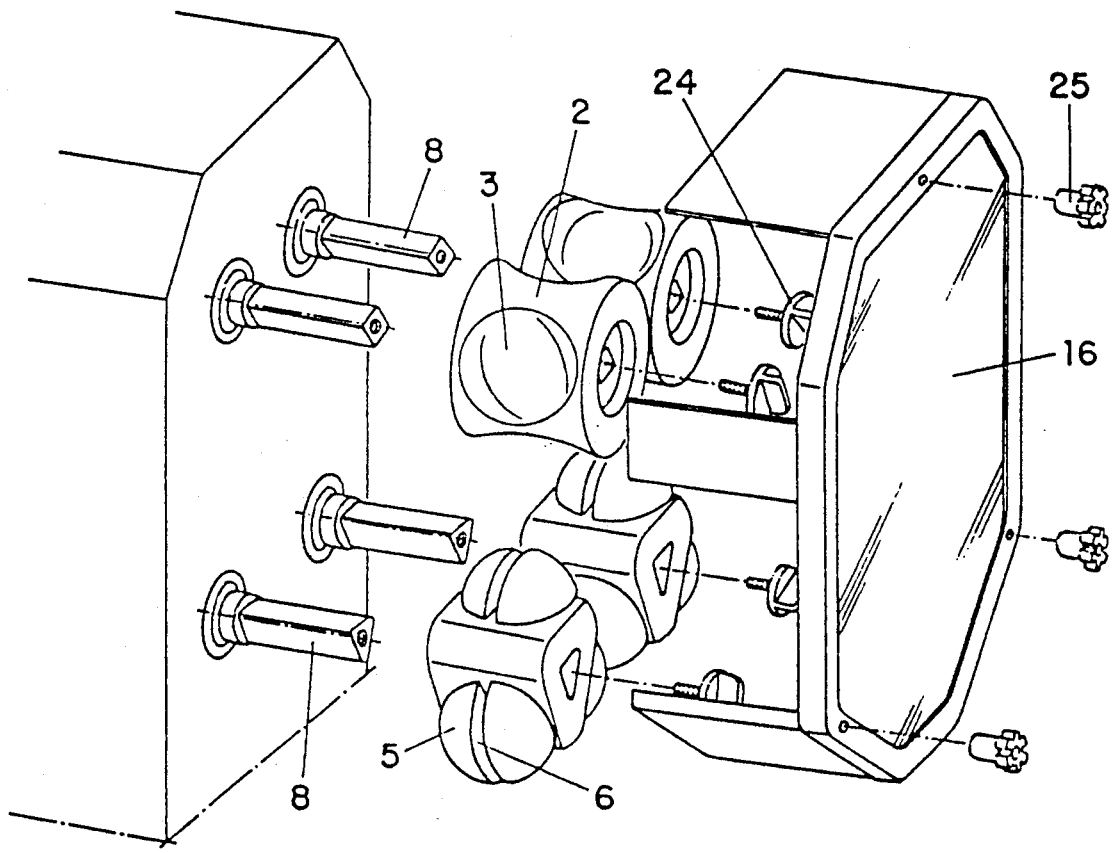
FIGS. 4 and 5 are views showing the parts of the inventive juice extracting machine, completely broken apart and also how a cutting blade and the accompanying parts of the machine are put together.

The machine for extracting juice from fruits in accordance with the present invention has a small chute which feeds fruits into the machine. Two first cylinders 2 are supported rotatably about horizontal axes and each has four semi-spherical cavities 3. The cylinders 2 rotate in opposite directions. When the fruits are fed by the chute 1 into the machine they are received in the cavities of the cylinders and transported downwardly to a cutting element 4 which has a cutting edge. The cutting element 4 cuts the fruits into two halves which remain lodged in the cavities of each cylinder.

Two second cylinders are located underneath the first cylinders 2 and rotate synchronously with the first cylinders. Each of the lower cylinders has three protrusions 5 which are formed as semi-spherical caps. The protrusions 5 of the second cylinders fit in the cavity 3 of the first cylinders with a little free space between them. The space is at least substantially equal to the thickness of the peel of each fruit, so that excessive pressing of the peels during the cooperation of the protrusions with the cavities is prevented. As a result, the major part of the honeycomb cells in the peel is prevented from releasing the oily essences and from dripping down into a receptacle, where otherwise they would be immediately integrated into an extracted juice.

During the synchronized movement of the cylinders, the peel remains stuck to the spherical caps of the protrusions 5. The caps are provided with circular grooves 6. When the cylinders with the heads rotate, they move near extracting blades 7 which pass through the grooves 6. As a result the pieces of the peel are quickly loosened by the blades and separated from the process, while those of a smaller diameter than the spherical caps are ejected. The juice is therefore permitted to flow freely without further contact with the fruit.

The cylinders are rotatably supported on axles which are identified with reference numerals 8. The axles of the upper cylinders have a square cross-section, while the axles of the lower cylinders have a triangular cross-section. Both fit together smoothly, and can be taken apart manually. The axles are held in place by wing-nut screws 24 which fit in supporting pads 9 mounted in a chassis 10. The chassis 10 is accommodated in a housing 11 which encloses a space for gears 12. The gears are driven from a motor with a reducer 13. In particular, the output shaft turns a pinion having a toothed circumference 14 which engages with a toothed wheel 15 which transmits the rotation to one of the gears 12 to impart the rotary movement to the cylinders.

The extracted juice drips down into a transparent container 16 and trickles down to gather in a sieve 17 which acts as a filter. It is there decanted into the interior of the receptacle 18 provided with an outlet tube through which the juice poures into a dispensing container or tumbler 36 to be served to a customer. Screws 25 hold the transparent container 16 in place.

Figure 8:
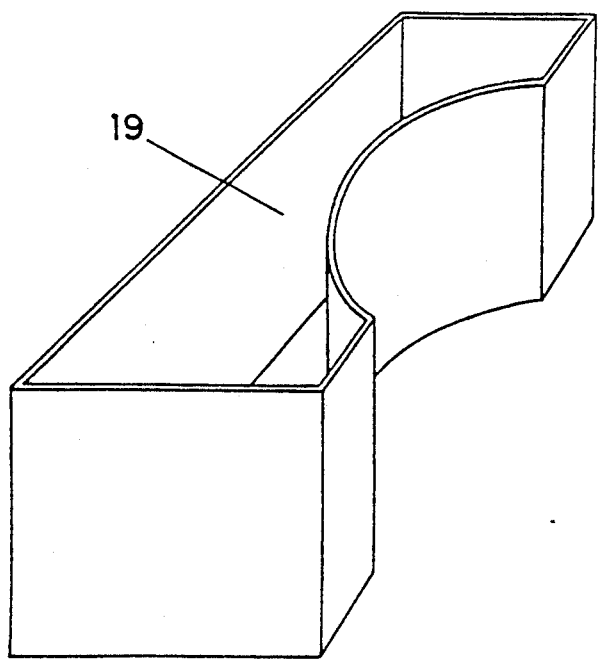
FIG. 8 is a view showing a basin-shaped receptacle into which the juice runs and from which it is poured.

The pieces of the peel of fruits fall into the interior of a receptacle 19 which has a vertically curved shape and is located in the lower part of the machine. The concave wall of the receptacle permits the dispensing container or tumbler 36 for collecting the juice to be placed inside the space provided by its specific shape which is shown in FIG. 8. The pieces of discarded peel run down to external side tubes 20 and guided by chutes 21 to a collection receptacle 22 located in a machine base 23.

Figure 5:
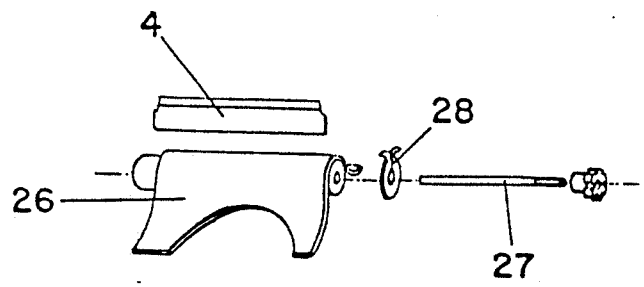

FIG. 5 shows an assembly of the cutting element 4 mounted on a supporting bracket 26. The supporting bracket has a shape of a little gabled roof with one of its "eaves" fitting into the front chassis which accommodates the motor of the machine. The casing is perforated axially so that a bolt 27 can be screwed with a washer 28 to hold the assembly in place. The mechanism can be taken apart for periodic cleaning by unscrewing the bolt.

Figure 6:
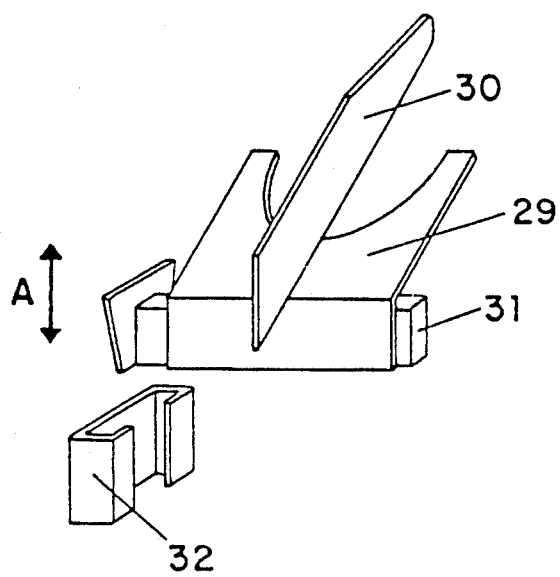
FIGS. 6 and 7 are views showing two extractors of the peel of the fruit to be squeezed, of the inventive juice extracting machine.
Figure 7:
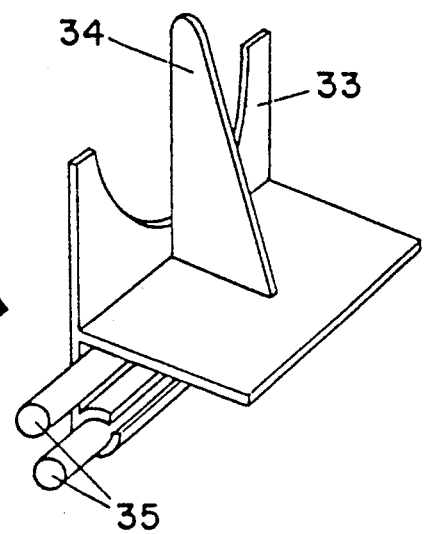

FIGS. 6 and 7 show the blades which separate the pieces of peel from the grooved spherical caps of the protrusions. The blade has a small plate 29 and a plate member 30, both mounted on a bracket 31. The front end of the bracket is shaped like a tail of a kite and fits into a support with a matching shape. The assembly can be taken apart by a vertical motion identified with the double-headed arrow 8. FIG. 7 shows a modification which includes a plate 33 and a plate member 34. The assembly is mounted on a pair of rods 35 and can be taken apart by a horizontal motion and identified by the double-headed arrow B.

It is to be understood that further modifications are possible as well. For example the discarded pieces of peel can slide down a pair of slide chutes that take them to a collection receptacle located in the lower part of the machine base. In another modification the pieces of the peel can fall into a centrally placed receptacle with a curved wall. It is located in the lower portion in the part of the machine where the extracted juice drips down into the receiving container positioned in the concave space created by the special shape of the receptacle.

It will be understood that each of the elements described above, or two or more together, may also find a useful application in other types of constructions differing from the types described above.

While the invention has been illustrated and described as embodied in a machine for extracting juice, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A machine for extracting juice from citrus fruits, comprising at least two first cylinders each having a plurality of substantially semi-spherical cavities for accommodating fruits rotatable in opposite directions to transport the fruits; cutting means located downstream of said first cylinders so as to bisect the fruits into two halves which remain lodged in said cavities of said first cylinders; at least two second cylinders located downstream of said first cylinder and each provided with a plurality of substantially spherical protrusions and rotatable so that during rotation said protrusions extend into each fruit embedded in said cavities of said first cylinders with a gap which remains between said protrusions and said cavities and is substantially equivalent to a thickness of a peel of the fruits thereby preventing excessive crushing of the peel, said first cylinders and said second cylinders being rotatable synchronously so that the peel remains sticking to said protrusions, said protrusions being provided with grooves; and blade means penetrating into said grooves of said protrusions during rotation of said cylinders so as to catch and throw off the peel while the juice flows freely without any further contact with a discarded part of the fruits.

2. A machine for extracting juice as defined in claim 1, wherein each of said first cylinders has four such cavities while each of said second cylinders has three such protrusions.

3. A machine for extracting juice as defined in claim 1, wherein said protrusions have semi-spherical heads, said semi-spherical heads of said protrusions and said semi-circular cavities of said first cylinders being concentric with one another in an engaging position.

4. A machine for extracting juice as defined in claim 1; and further comprising means for supporting said cylinders during their rotation and including at least two first axles supporting said first cylinders and at least two second axles supporting said second cylinders, said first axles having a square cross-section while said second axles having a triangular cross-section.

5. A machine for extracting juice as defined in claim 4; and further comprising means for imparting rotation to said axles and including a motor having an output shaft, and a plurality of gears transmitting a rotation of said output shaft to said cylinders.

6. A machine for extracting juice as defined in claim 5; and further comprising a casing accommodating said gear; and means for fixing said cylinders on said axles and including supporting pads mounted on said casing and ring nuts extending through said cylinders and engaging in said supporting pads.

7. A machine for extracting juice as defined in claim 6; and further comprising a further casing for accommodating said cylinders, said first mentioned casing which accommodates said gears being not transparent while said second casing for accommodating said cylinders being transparent.

8. A machine for extracting juice as defined in claim 7; and further comprising a sieve which is formed as a filter so that the extracted juice drips through the filter; a basin arranged for receiving the filtered juice and having an outlet; a dispensing container into which the juice is poured from said outlet of said basin and presentable to a user; means forming side openings for discarding the peel of the fruit; substantially vertical chutes for guiding the discarded peel of the fruits, a receptacle for receiving the discarded peel of the fruit, and a curved receptacle accommodating said dispensing container for juice.

9. A machine for extracting juice as defined in claim 1, wherein said cutting means includes a cutting blade for slicing the fruit, a supporting bracket on which said cutting blade is mounted and having the shape of a small roof with two eaves, a frictional washer and a rod extending through said frictional washer and engageable into said supporting bracket so as to releasably assembly said coupling means.

10. A machine for extracting juice as defined in claim 1, wherein said blade means includes a blade, a plate bearing a plate, a bracket mounting said blade and said plate and formed as a kite tail with a free end also of the shape of a kite tail to be taken apart vertically.

11. A machine for extracting juice as defined in claim 1, wherein said blade means includes a blade, a plate bearing a plate, a bracket mounting said blade and said plate and formed as a kite tail with a free end also of the shape of a kite tail to be taken apart horizontally.

* * * * *